(No Model.)
W. A. COLLINS.
SPRINKLING MACHINE.
No. 490,900. Patented Jan. 31, 1893.
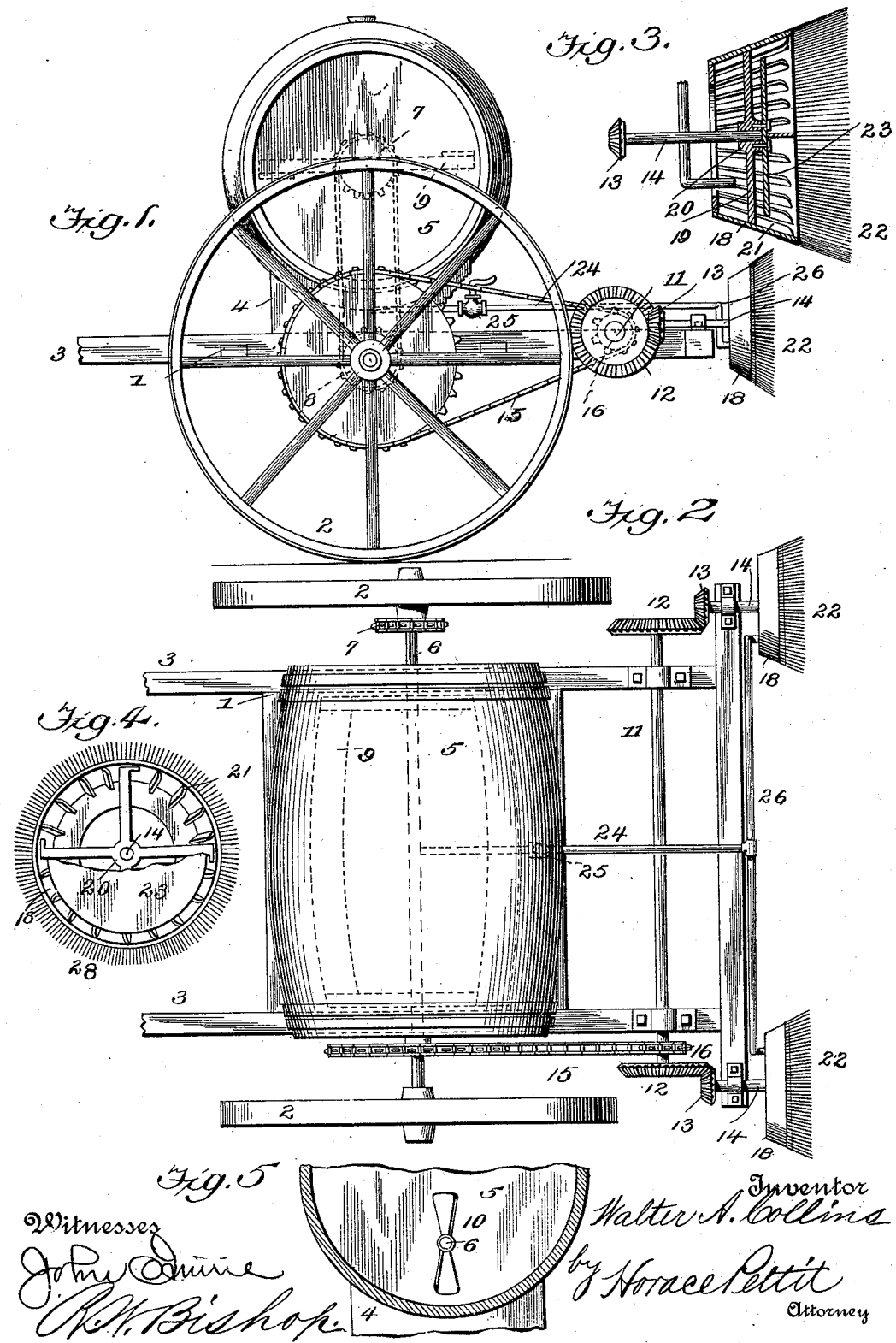

United States Patent Office.

WALTER A. COLLINS, OF TULLYTOWN, PENNSYLVANIA.

SPRINKLING-MACHINE.

SPECIFICATION forming part of Letters Patent No. 490,900, dated January 31, 1893.

Application filed August 29, 1892. Serial No. 444,434. (No model.)

*To all whom it may concern:*

Be it known that I, WALTER A. COLLINS, a citizen of the United States, residing at Tullytown, in the county of Bucks and State of Pennsylvania, have invented certain new and useful Improvements in Sprinkling-Machines; and I do hereby declare the following to be a full, clear, and exact description of the invention, such as will enable others skilled in the art to which it appertains to make and use the same.

The object of my invention is to produce a machine which is specially adapted for sprinkling or spraying vines with a poisonous liquid so as to kill noxious bugs or other insects, and which may be drawn by a horse or other animal, and will thoroughly sprinkle or spray all portions of the ground and vines.

My invention is particularly adapted for sprinkling a solution of paris green upon potato vines, so as to kill the potato bugs, but it may be used for sprinkling other vines, and any kind of poisonous liquid may be used in connection with it.

To this end, my invention consists in certain novel features which will be hereinafter described and claimed.

In the annexed drawings, which fully illustrate my invention, Figure 1 is a side elevation of a machine embodying my invention; Fig. 2 is a plan view of the same; Fig. 3 is a detail section of one of the distributers; Fig. 4 is an end view of the same, and Fig. 5 is a detail view of a preferred form of agitator.

In carrying out my invention, I employ a frame 1 which is mounted on a wheeled axle 2 and is provided with shafts 3 by means of which it may be drawn over the ground. Upon this frame 1, I erect the standards or supports 4 upon which is secured a tank or barrel 5, as shown. A shaft 6 extends longitudinally through the tank and is provided at one end with a sprocket pinion 7 which is connected by a suitable chain with a similar pinion 8 on the axle. Within the tank or barrel, the shaft 6 is provided with laterally extending arms or dashers 9 so that as the machine is drawn forward, the shaft 6 will be rotated and the liquid thoroughly agitated to prevent the poison from settling.

Instead of using the dashers or lateral arms 9, however, for an agitator, I prefer to provide the shaft 6 with agitators 10 (shown in Fig. 5) which are substantially like the common form of screw propeller. These agitators are secured to the shaft near each end of the barrel or reservoir and the shaft may be so placed that the blades will extend to a point near the bottom of the tank. The agitators are preferably provided with two blades and are arranged in the barrel or reservoir so that when revolved they will force the liquid from the ends toward the center, so that it will run freely from the tank.

A transverse shaft 11 is mounted in suitable bearings at the rear end of the frame and is provided with bevel pinions 12 at its ends which mesh with pinions 13 on the front ends of short shafts 14 mounted on the sides of the frame and having the distributers secured to their rear ends. Motion is imparted to the transverse shaft 11 by means of a chain belt 15 passing around a sprocket pinion 16 on said shaft and a sprocket wheel 17 on the axle.

The distributers consist of a cone-shaped casing 18 having the radial arms or spokes 19 extending to a central hub 20 which is secured rigidly to the end of the shaft 14. On the inner face of the cone-shaped casing I provide a series of diagonal plates or blades 21 and to the rear edge of the casing I preferably secure a series of wires or bristles 22. These wires or bristles may, however, be omitted. A disk 23 is secured to the rear end of the hub and is of a slightly less diameter than the casing so that its edge is near but out of contact with the blades 21. A pipe 24, having a valve 25, leads from the tank to a transverse pipe 26 at the rear end of the frame, and this transverse pipe has its ends bent rearward and carried close to the disks 23.

If it be desired to use the machine, the tank is filled with the liquid poison, the valve 25 is opened and the machine is then drawn over the ground. The liquid flows from the tank to the transverse pipe 26 and is discharged from said pipe against the disks 23 and by them deflected against the casings. The gearing shown and described causes the casings to rotate rapidly as the machine is drawn over the ground and consequently the liquid will be thrown from the casing by the blades and scattered over the ground. The bristles on the rear edges of the casings will cause the liquid to be more thoroughly diffused and sprayed over the plants.

Having thus described my invention, what I claim and desire to secure by Letters Patent, is:—

1. A distributer for sprinkling machines consisting of a revoluble truncated cone-shaped casing, an axis, a water-deflecting disk secured to said casing at or near the discharge end disposed at a substantially right angle to the line of the axis, a water nozzle discharging within said casing and means for revolving said casing, substantially as described.

2. A distributer for sprinkling machines consisting of a revoluble casing, a water-deflecting disk secured in said casing at or near the outer end at a substantially right angle to the line of axis of said casing, a water nozzle inwardly directed toward said deflecting disk and brush provided upon the outer edge of the casing, substantially as described.

3. In a sprinkling machine the combination of a tank, revoluble casing, a water-deflecting disk provided in said casing at right angles to the line of the axis of said casing, a water nozzle in said casing in proximity with the inner face of the deflecting disk and brush provided upon the outer edge of said casing, substantially as described.

4. A distributer for sprinkling machines consisting of a revoluble casing provided upon a centrally disposed axis, a water deflecting disk secured to said casing at or near the discharge end, bristles provided upon said casing at the discharge end, series of blades diagonally disposed upon inner face of the casing, water nozzle protruding within said casing in proximity with the deflecting plate and means for revolving said casing substantially as described.

In testimony whereof I affix my signature in presence of two witnesses.

WALTER A. COLLINS.

Witnesses:
W. F. SMITH,
CHAS. H. WILLIAMS.